United States Patent
Vialen et al.

(10) Patent No.: US 6,556,833 B2
(45) Date of Patent: Apr. 29, 2003

(54) METHOD AND SYSTEM FOR TRANSMITTING A POSITION INFORMATION

(75) Inventors: Jukka Vialen, Espoo (FI); Kalle Ahmavaara, Helsinki (FI)

(73) Assignee: Nokia Corporation, Espoo (FI)

( * ) Notice: Subject to any disclaimer, the term of this patent is extended or adjusted under 35 U.S.C. 154(b) by 120 days.

(21) Appl. No.: 09/862,127

(22) Filed: May 21, 2001

(65) Prior Publication Data

US 2002/0006794 A1 Jan. 17, 2002

Related U.S. Application Data

(63) Continuation of application No. PCT/EP98/08065, filed on Dec. 10, 1998.

(51) Int. Cl.[7] .................................................. H04Q 7/20
(52) U.S. Cl. ...................................... 455/456; 701/207
(58) Field of Search ................................. 455/456, 426, 455/422, 560, 561, 436–442, 404, 521, 457; 701/251; 342/357.01, 357.1

(56) References Cited

U.S. PATENT DOCUMENTS 5,754,955 A    5/1998   Ekbatani
6,212,391 B1 * 4/2001   Saleh et al. ................. 455/456
6,256,489 B1 * 7/2001   Lichter et al. .............. 455/456
6,421,009 B2 * 7/2002   Suprunov .................... 342/457

FOREIGN PATENT DOCUMENTS

EP    0546758 A2    6/1993
EP    0805609 A2    11/1997

* cited by examiner

*Primary Examiner*—Tracy Legree
(74) *Attorney, Agent, or Firm*—Squire, Sanders & Dempsey LLP

(57) ABSTRACT

A method and system for transmitting a position information from a mobile terminal of a mobile communication network via a network element to a network node, wherein a control information indicating the requirement of a position information of the mobile terminal at the network node is set in the radio interface message. This control information is checked at the network element as to whether a position information has to be forwarded or not. The position information is determined at the network element and may be combined with a higher layer information so as to generate a complete higher layer information to be forwarded to the network node. Thereby, a position information can be supplied to the network node without substantially increasing overhead and processing power required for the radio interface message.

18 Claims, 3 Drawing Sheets

METHOD AND SYSTEM FOR TRANSMITTING A POSITION INFORMATION

This application is a continuation of international application Ser. No. PCT/EP98/08065, filed Dec. 10, 1998.

FIELD OF THE INVENTION

The present invention relates to a method and system for transmitting a position information from a mobile terminal of a mobile communication network such as a UTRAN (UMTS Radio Access Network) via a network element to a network node such as an SGSN (Serving GPRS Support Node) of the GPRS (General Packet Radio Service) or an MSC (Mobile Switching Center) of the GSM (Global System for Mobile Communications) or their equivalents in the UMTS (Universal Mobile Telecommunications System).

BACKGROUND OF THE INVENTION

Third generation mobile telecommunications systems aim at providing end-users, apart from terminal and personal mobility, with enhanced services. Compared to second generation systems, enhancement that will cover features all the way between the end-user and core network elements are required, i.e. from mobile terminals to radio access and fixed networks.

FIG. 1 shows a mobile communication system such as a UMTS system, wherein a UTRAN system is connected to a GPRS-based core network and to a GSM-based core network. According to FIG. 1, a mobile station (MS) 1 is radio-connected to at least one base station (BS) 2 which is connected to a Radio Network Controller (RNC) 3 of the UTRAN. In Code Division Multiple Access (CDMA) based systems, the MS 1 can be connected to several BS 2 simultaneously due to macrodiversity.

The RNC 3 is connected to a mobile switching center (MSC) 5 of the UMTS or GSM core network which provides access to a circuit-switched network such as a Public Switched Telephone Network (PSTN) 8 or to a packet-switched network such as the Internet 9.

Additionally, the RNC 3 is connected to an SGSN 6 of the UMTS or GPRS core network. The SGSN 6 is connected to a Gateway GPRS Support Node (GGSN) which provides access to the Internet 9.

Thus, the RNC 3 is connected to two non-coordinated core network nodes which may, both establish an active connection with the MS 1.

In the GSM system, a cell information field in the A-interface between a Mobile Switching Center (MSC) and a Base Station Controller (BSC) is bound to certain radio interface messages, called initial layer 3 messages. However, these radio interface messages do not comprise any position information relating to the position of the MS 1.

In the UMTS, the MS 1 may be connected via the RNC 3 of the UTRAN 4 to an independent core network node (CN node) such as the MSC 5 or the SGSN 6. In this case, new services of the CN node may require a position information of the MS 1 for an individual setup of the service.

Moreover, it is possible to use one RRC (Radio Resource Control) connection to two independent higher layer connections (connections at Mobility Management (MM) level or connections at Connection Management (CM) level) of corresponding CN nodes. However, if another service is already provided to the MS 1, the UTRAN 4 does not automatically insert a position information when forwarding the service setup to the CN node, when existing GSM methods are used.

Thus, a mechanism is required to indicate to the RNC 3 that a higher layer protocol data unit (PDU) received from the MS 1 is an initial layer 3 message that should be sent as a complete layer 3 message including an additionally required MS position information to the CN node even if an active connection to the other CN node exists. In addition, the same mechanism can be used for non-initial layer 3 messages if the MS position information needs to be included therein, e.g. in case of a setup of an additional service.

SUMMARY OF THE INVENTION

It is therefore an object of the present invention to provide a method and system for transmitting a position information from a mobile terminal of a mobile communication network via a network element to a network node requiring the position information of the mobile terminal.

This object is achieved by a method for transmitting a position information of a mobile terminal of a mobile communication network to a network node using an intermediate network element, comprising the steps of: setting a control information in a radio interface message, which indicates the requirement of the position information of the mobile station at the network node, transmitting the radio interface message to the network element, checking the control information at the network element, and determining and forwarding the position information to the network node in response to the result of the checking step.

Furthermore the above object is achieved by a system for transmitting a position information of a mobile terminal of a mobile communication network to a network node using an intermediate network element, wherein said mobile terminal comprises:

setting means for setting a control information in a radio interface message, which indicates the requirement of a position information of the mobile station at the network node, and transmitting means for transmitting the radio interface message to the network element, and wherein the network element comprises:

checking means for checking the control information; and determining means for determining the position information in response to the checking result of the checking means.

Accordingly, since a control information is added to the radio interface message, this parameter can be used at the RNC 3 to determine whether a position information should be forwarded to the core network through the corresponding Iu interface.

Thereby, the protocol amendments and additionally required information at the RRC level can be kept short so as to minimize message overhead transmitted via the radio interface.

An additional advantage arises when the position of the MS 1 can be detected more accurately than the cell level at the RNC 3 and new services need such an accurate position information. Then, only a short control information has to be transmitted via the radio interface to the RMC 3 in order to indicate that the position information must be added before forwarding the message to the CN.

A higher layer information may be incorporated into the radio interface message at the mobile terminal, wherein the position information is combined with the higher layer information at the network element in response to the checking result. Thereby, a complete higher layer message including an additionally required MS position information can be forwarded to the network node.

Preferably the control information is provided in a control field used for signaling the requirement of the position information. This control field may have a length of one bit. Accordingly, the required additional overhead of a radio interface message can be restricted to only one bit.

Alternatively, the length of this control field may be more than one bit, if e.g. several accuracy levels of the MS position are possible.

Furthermore, a position measurement information can be incorporated at the MS1 into the radio interface message before transmission, wherein the position information may be determined at the RNC 3 on the basis of the position measurement information.

The position measurement information may also be sent from the MS to the network element, i.e. UTRAN, if no higher layer message is included. This position measurement reporting can be started either by an explicit request from the network element or it can be part of a default measurement started without explicit request from the network element.

In case no position information is required, the higher layer information can be transmitted in a transparent mode to the network node. Thus, the determination of the MS position at the RNC 3 is restricted to those cases, where it is actually required. Thereby, processing capacity is saved and unnecessary delay can be prevented.

Preferably, the network element is a radio network controller of the mobile communication network such as a radio access network of the UMTS, and the network node is a mobile switching center or a serving GPRS support node.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
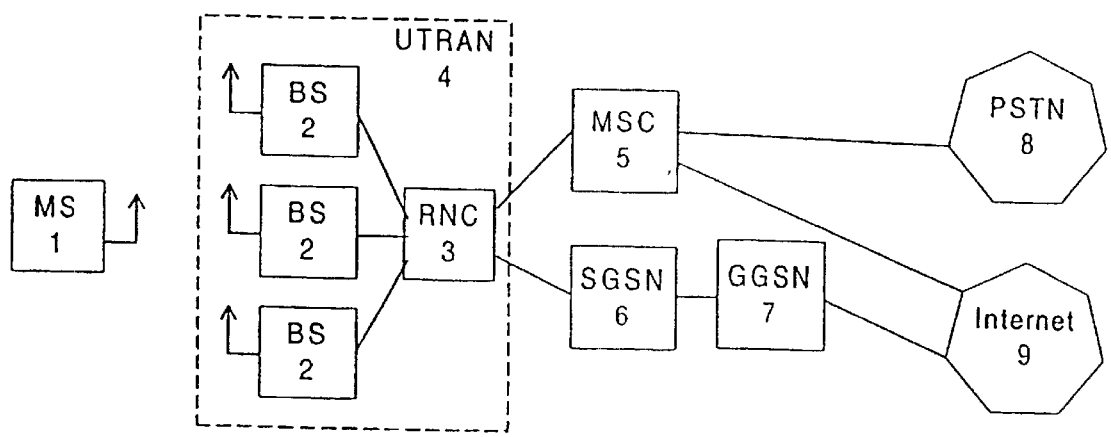
FIG. 1 shows a principle block diagram of a mobile communication network connected to two independent core networks.

In the following, the preferred embodiment of the method and system according to the present invention will be described on the basis of a mobile communication system such as the UMTS system shown in FIG. 1.

In case a connection is established between the MS 1 and one of the CN nodes MSC 5 or SGSN 6, an RRC connection is used to send a corresponding higher layer PDU via the UTRAN 4. Such a higher layer message could be an MM (Mobility Management) layer message or a CM (Connection Management) layer message and is carried over the radio interface piggypacked into a radio interface message, i.e. an RRC message such as RRC Direct Transfer. Since the MS 1 knows based on the MM layer or the RRC layer, whether the present higher layer message is to be carried to the CN with a position information or not, a position information control field may be provided in the RRC message.

Figure 2:
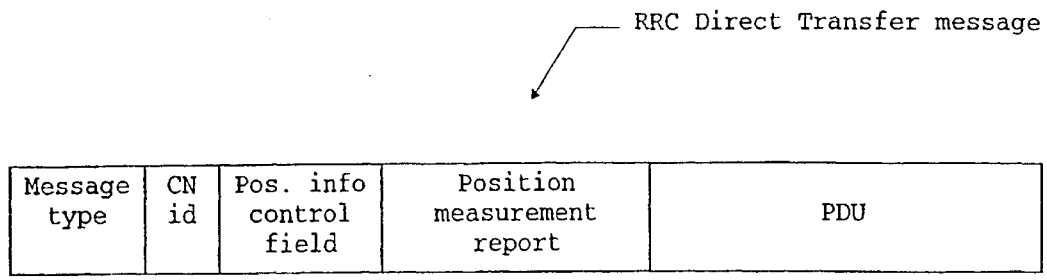
FIG. 2 shows an RRC Direct Transfer message according to the preferred embodiment of the present invention.

FIG. 2 shows an RRC Direct Transfer message according to the preferred embodiment, which is transmitted by the MS 1 to the RNC 3. The position information control field may consist of one bit which notifies whether a position information is required at the CN, or not. Alternatively, the position information control field may consist of more than one bit, if e.g. several accuracy levels are provided for the position information. In case the MS 1 derives from the MM or RRC layer information that the CN supplying the requested service requires a position information, it sets the position information control bit in the RRC Direct Transfer message to "0". If no position information is required, the position information control bit remains "1". Of course, an opposite setting control of the position information control bit is possible as well.

In addition thereto, a position measurement report can be added to the RRC Direct Transfer message so as to be used by the RNC 3 to calculate the MS position. Alternatively, the position measurement report can be a separate procedure between the MS 1 and the UTRAN 4, independent from the transmitting of the RRC Direct Transfer message.

Other contents of the RRC Direct Transfer message are a message type information used to indicate the type of the RRC message, a CN identifier used as a routing information for routing the higher layer information from the MS 1 to the correct Iu interface connection, and the higher layer information, i.e. higher layer PDU, to be transmitted to the CN.

Thus, upon receiving the above described RRC Direct Transfer message, the RNC 3 can calculate the MS position and generate a corresponding Iu interface message as a complete layer 3 information.

In case the one bit position information control field is set to "1", the RNC 3 detects that no position information is needed at the CN and transmits the higher layer information in a transparent manner over the Iu interface. In this case, a Direct Transfer Application Part (DTAP) of the layer 3 protocol at the RNC 3 is used.

Figure 3:
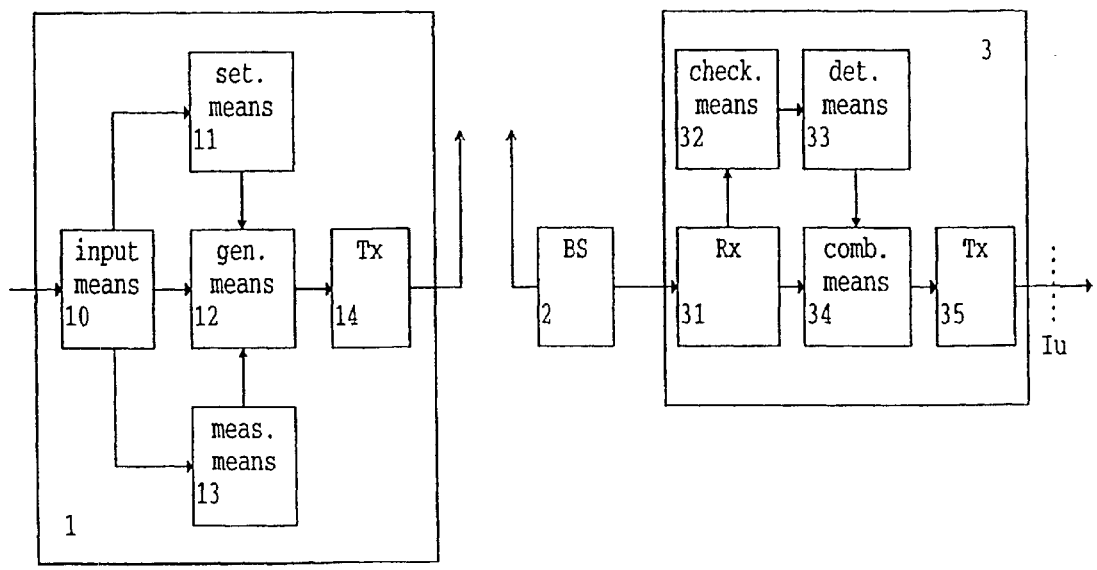
FIG. 3 shows a block diagram of a radio access network according to the preferred embodiment of the present invention.

FIG. 3 shows a block diagram of a radio access network such as the UTRAN 4 according to the preferred embodiment of the present invention.

According to FIG. 3, the MS 1 comprises an input means 10 for inputting a higher layer message to be transmitted via the radio interface of the UTRAN 4 and the Iu interface to an independent CN node such as the MSC 5. Such a higher layer message could be a setup request for a service provided by the MSC 5.

Furthermore, a setting means 11 is provided to which an information derived from the higher layer message is supplied from the input means 10 as to whether the connected CN node requires a position information, or not. In response to this information, the setting means 11 supplies an instruction to a message generating means 12 so as to correspondingly set the position information control field of the RRC message generated by the message generating means 12 on the basis of the higher layer message or PDU supplied from the input means 10.

Optionally, a measurement means 13 may be provided for supplying a position measurement report to a generating means 12, wherein the position measurement report is incorporated at a corresponding field in the RRC message, if the position information is required.

Finally a transmitter Tx 14 is connected to the message generating means 12 so as to transmit the generated RRC message via the radio interface.

The transmitted RRC message is received by the BS 2 of the UTRAN 4 and supplied to the RNC 3, as previously described in connection with FIG. 1.

Figure 4:
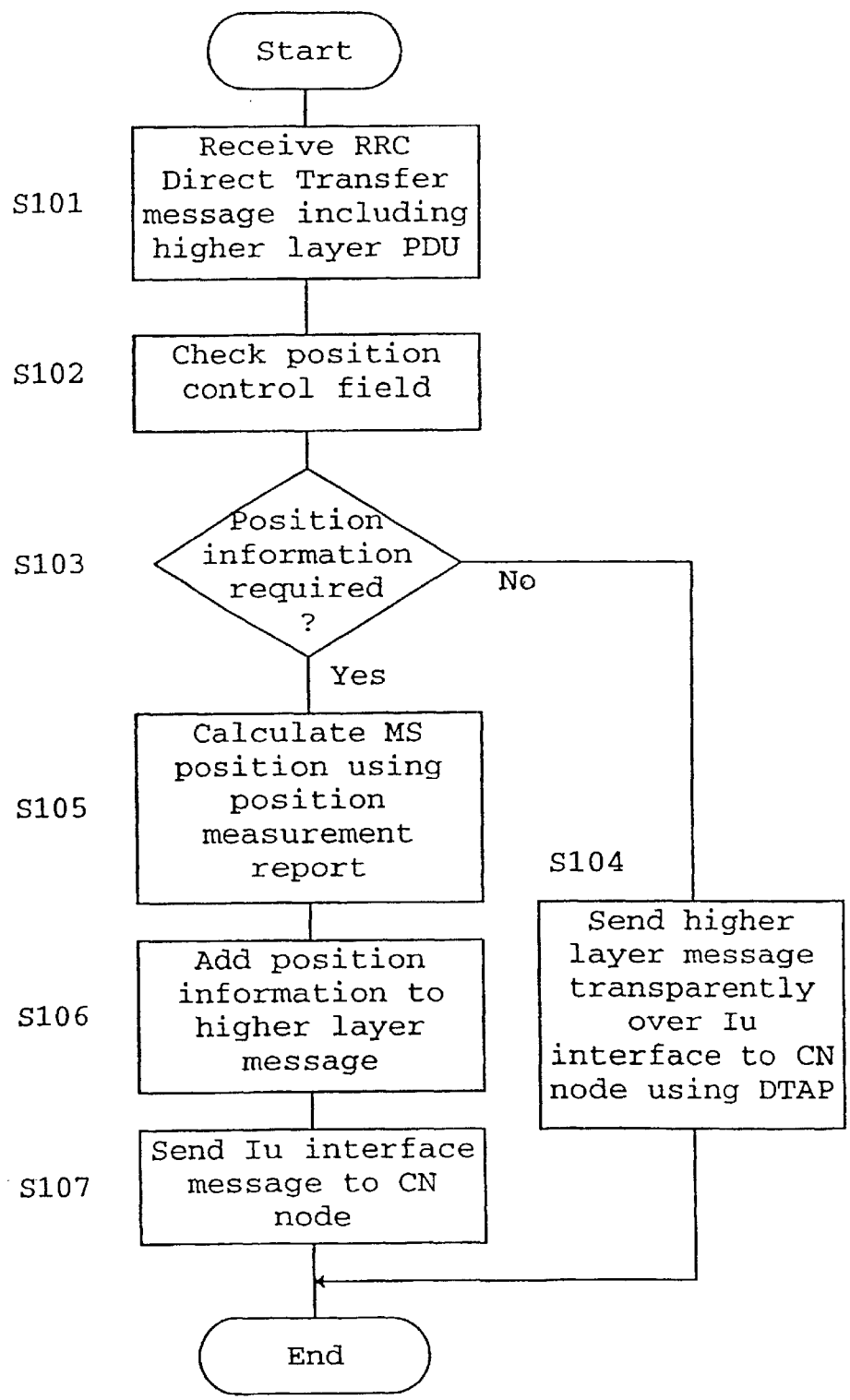
FIG. 4 shows a flow diagram of a transmission control procedure according to the preferred embodiment of the present invention.

In the following, the operation of the RNC 3 shown in FIG. 3 is described with reference to the flow diagram shown in FIG. 4, wherein an RRC Direct Transfer message including a higher layer PDU is transmitted to the RNC 3.

The RRC Direct Transfer message including the higher layer PDU for the CN node is received by a receiver Rx 31 of the RNC 3 (step S101). Thereafter, the position information control field of the RRC message is checked by a checking means 32 connected to the Rx 31 (S102). Then, the received RRC message is supplied to a combining means 34. If the checking performed in the checking means 32 reveals in step S103 that no position information is required, the higher layer message (higher layer PDU) is supplied to a transmitter Tx 35 and sent to the desired CN node via the Iu interface in a transparent manner using the DTAP protocol (S104).

Otherwise, if the checking means 32 determines that a position information is required at the CN node, a corresponding information is supplied by the checking means 32 to a determining means 33 which is arranged to determine the position information.

Subsequently, the determining means 33 calculates the position of the transmitting MS 1 using the position measurement report included in the RRC message (step S105). Alternatively, the position information may be calculated or determined based on a corresponding position information of the MS 1 provided in the RNC 3.

Thereafter, the determining means 33 supplies the determined position information to the combining means 34, where the position information is combined with or added to the higher layer message so as to generate a Iu interface message (step S106). Thus, the Iu interface message corresponds to a complete layer 3 information.

Finally, the generated Iu interface message is sent by the Tx 35 to the desired CN node (S107).

Accordingly, a position information can be transmitted via the UTRAN 4 of the UMTS without requiring major changes of the radio interface messages, i.e. the RRC messages. Essentially, only one bit has to be added as a new parameter to each RRC message carrying a higher layer PDU on the radio interface. Alternatively, the position information control field may consist of more than one bit, if e.g. several accuracy levels are provided for the position information.

It is to be pointed out, that the transmission method and system described in the preferred embodiment is not restricted to the UTRAN of a UMTS, but can be used in connection with any mobile communication network where a higher layer message is to be carried on a radio interface message which does not include any position information. The above description of the preferred embodiment and the accompanying drawings are only intended to illustrate the present invention. The preferred embodiment of the invention may vary within the scope of the attached claims.

In summary, a method and system for transmitting a position information from a mobile terminal of a mobile communication network via a network element to a network node is described, wherein a control information indicating the requirement of a position information of the mobile terminal at the network node is set in the radio interface message. This control information is checked at the network element as to whether a position information has to be forwarded or not. The position information is determined at the network element and may be combined with a higher layer information so as to generate a complete higher layer information to be forwarded to the network node. Thereby, the position information can be supplied to the network node without substantially increasing overhead and processing power required for the radio interface message.

What is claimed is:

1. A method for transmitting a position information of a mobile terminal of a mobile communication network to a network node using an intermediate network element, comprising the steps of:
   a) setting, in a radio interface message from said mobile terminal to said intermediate network element, a control information which indicates the requirement of said position information of said mobile terminal at said network node;
   b) transmitting said radio interface message from said mobile terminal to said intermediate network element;
   c) checking said control information at said intermediate network element, and, when the result of said checking step indicates the requirement of said position information of said mobile terminal at said network node;
   d) determining and forwarding said position information to said network node.

2. A method according to claim 1, further comprising the step of incorporating a higher layer information into said radio interface message, and forwarding said position information together with said higher layer information to said network node.

3. A method according to claim 2, wherein said higher layer information is transmitted in a transparent mode to said network node, when said checking step reveals that no position information is required.

4. A method according to claim 1, wherein said control information is provided in a control field used for signaling the requirement of said position information.

5. A method according to claim 4, wherein said control field has a length of one bit.

6. A method according to claim 4, wherein said control field has a length of more than one bit, each value of said control field referring to an accuracy level of said position information.

7. A method according to claim 1, further comprising the steps of incorporating a position measurement information into said radio interface message before said transmission step, and determining said position information on the basis of said position measurement information.

8. A method according to claim 1, wherein said network element is a radio network controller of said mobile communication network, and wherein said setting step is performed in said mobile terminal.

9. A method according to claim 1, wherein said mobile communication network is a radio access network of the UMTS, and wherein said network node is a mobile switching center or a serving GPRS support node.

10. A system for transmitting a position information of a mobile terminal of a mobile communication network to a network node using an intermediate network element,
   a) wherein said mobile terminal comprises:
       setting means for setting a control information in a radio interface message, which indicates the requirement of said position information of said mobile terminal at said network node; and transmitting means for transmitting said radio interface message to said intermediate network element; and b) wherein said intermediate network element comprises:
checking means for checking said control information; and
determining means for determining said position information when the checking result of said checking means indicates the requirement of said position information of said mobile terminal at said network node,
said intermediate network element being adapted to forward said position information to said network node.

11. A system according to claim 10, wherein said mobile terminal comprises a message generating means for incorporating a higher layer information into said radio interface message; and wherein said network element comprises combining means for combining said position information with said higher layer information in response to said checking result.

12. A system according to claim 11, wherein said message generating means is arranged to incorporate a position measurement information into said radio interface message, and wherein said determining means is arranged to determine said position information on the basis of said position measurement information.

13. A system according to claim 10, wherein said network element is a radio network controller of said mobile communication network.

14. A system according to claim 10, wherein said mobile communication network is a radio access network of the UMTS, and wherein said network node is a mobile switching center or a serving GPRS support node.

15. A network element for forwarding a position information of a mobile terminal to a network node, comprising:

a) checking means for checking a control information provided in a radio interface message received from said mobile terminal; and b) determining means for determining said position information when the checking result of said checking means indicates the requirement of said position information of said mobile terminal at said network node,
said network element being adapted to forward said position information to said network node.

16. A network element according to claim 15, further comprising combining means for combining said position information of said mobile terminal with a higher layer information, to be forwarded to said network node, in response to said checking result.

17. A network element according to claim 15, wherein said determining means determines said position information on the basis of a position measurement information included in said received radio interface message.

18. A network element according to claim 15, wherein said network element is a radio network controller of a radio access network of the UMTS, and wherein said network node is a mobile switching center or a serving GPRS support node.

* * * * *